United States Patent [19]
Gregory

[11] 3,727,532
[45] Apr. 17, 1973

[54] SPHERICAL CAMERA MODEL SYSTEM

[75] Inventor: Gerald A. Gregory, Binghamton, N.Y.

[73] Assignee: Singer Company, New York, N.Y.

[22] Filed: May 10, 1971

[21] Appl. No.: 141,871

[52] U.S. Cl. ..........................95/86, 95/12.5, 95/85
[51] Int. Cl. ..............................................G03b 17/56
[58] Field of Search....................95/86, 82, 85, 12.5

[56] References Cited

UNITED STATES PATENTS

| | | |
|---|---|---|
| 1,179,330 | 4/1916 | Leithold..................................95/86 |
| 2,633,054 | 3/1953 | Black....................................95/86 X |
| 3,495,516 | 2/1970 | Henderson..........................95/86 X |

*Primary Examiner*—Samuel S. Matthews
*Assistant Examiner*—E. M. Bero
*Attorney*—Francis L. Masselle, John C. Altmiller and William Grobman

[57] ABSTRACT

A TV camera mounted on a support structure within a spherical shell to provide video signals for display. The support structure is rotatable and the camera is movably mounted thereon. Air can be applied to the interior of the shell to press a sheet of flexible material including display data against the surface of the shell.

8 Claims, 4 Drawing Figures

Patented April 17, 1973

INVENTOR.
Gerald A. Gregory
BY
John C. Altmiller
AGENT

INVENTOR.
Gerald A. Gregory
BY
John C. Altmiller
AGENT

SPHERICAL CAMERA MODEL SYSTEM

BACKGROUND OF THE INVENTION

1. Field of Invention

This invention relates to visual display systems and more particularly to a camera-model display system utilizing a hollow, spherical skeletal frame.

2. Description of the Prior Art

In the training of an aircraft pilot, costly flight training is avoided by providing a simulated cockpit of an aircraft wherein there is a simulation of many aspects of the environment within the cockpit of an actual aircraft. A portion of the training includes the utilization of a simulated visual scene from an aircraft.

The pilot uses the visual scene most often during a takeoff or a landing. Therefore, most simulators simulate the visual scene near an airport. In one type of simulator, a motion picture is made of the visual scene in an actual aircraft during a landing or a takeoff. The motion picture may thereafter be projected through a complex optical system thereby providing a simulated visual scene in a realistic perspective.

In another type of simulator, an optical probe "flies" over a scale model of an airport and the surrounding terrain. The optical probe provides a simulated visual scene to a TV camera. The TV camera provides video signals to a CRT display within the simulator thereby providing the simulated visual scene. The camera-probe system has the advantage of a "fly around" capability. A trainee may, for example, abort a landing and do touch-and-go landings since the simulated visual scene is not limited to the matter on a film.

One of the major problems in camera model systems is the large size of the models and the probe transports required to obtain a simulated detailed visual scene. Additionally, end curtains may have to be provided near the ends of the model to provide a continuous view of the simulated terrain. Reflective end curtains are described in the United Kingdom Pat. No. 958,353.

SUMMARY OF THE INVENTION

It is a principal object of the present invention to provide a camera model simulation system.

Another object of the present invention is to provide a model for a camera model simulation system wherein terrain shapes and features, particularly the areas around airports, may be quickly and conveniently altered.

Another object of the present invention is to provide a camera model simulation system having a display whereon a view of simulated terrain is properly cut off at the horizon for all headings of a simulated aircraft.

According to the present invention, a model has simulated terrain features on the interior surface of a sphere; a camera-probe is selectively positioned for providing video signals representative of selected portions of said interior surface at a selected distance therefrom.

The present invention eliminates the need for end curtains, increases the model area in a given space, simplifies the apparatus for positioning the camera probe, and provides a simulated terrain whereon features may be readily changed.

Other objects, features and advantages of the invention will in part be obvious and will in part appear hereinafter.

For a fuller understanding of the nature and objects of the invention reference should be had to the following detailed description taken in connection with the accompanying drawing.

DESCRIPTION OF THE PREFERRED EMBODIMENT

A cockpit 11 has substantially the same interior construction, controls and instruments as the cockpit of an aircraft which is simulated. In response to the movement of the controls, control signals are provided to a computer 13 which has stored therein a math model based upon the equations of motion, the engine equations and other parameters relating to the aircraft. In response to the control signals, the computer 13 provides signals to drive the instruments, provides control loading forces and provides other simulated phenomenon to the cockpit 11, all in accordance with conventional practice. The computer 13 also provides signals to a camera model system 15 to drive a camera-probe assembly contained therein. The camera-probe assembly is driven in accordance with the simulated flight of the aircraft over terrain represented by the model. A television camera included in the camera-probe assembly provides video signals for generating an image on a display 17 which may be viewed in the cockpit 11.

Figure 2:
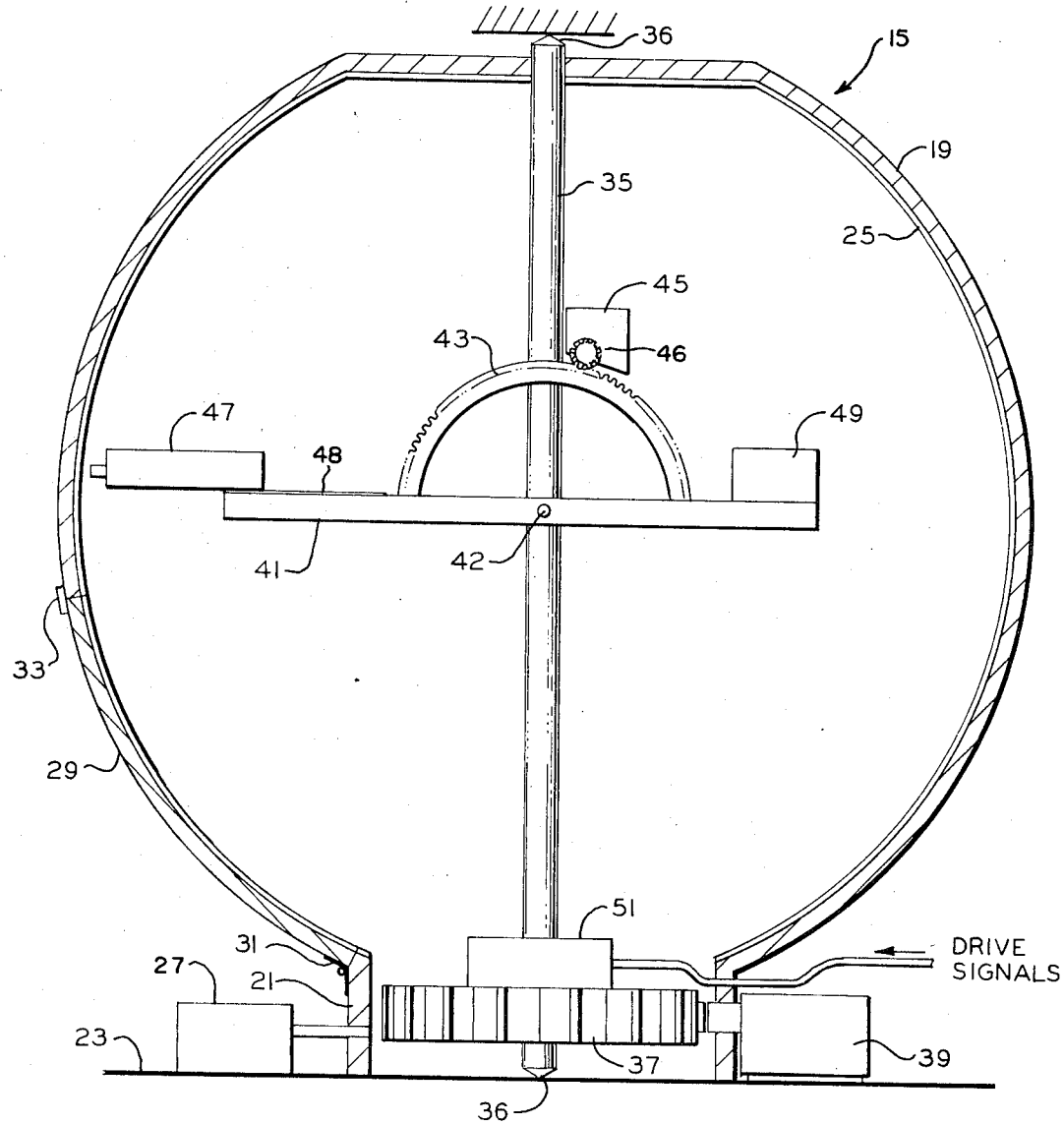
FIG. 2 is a sectioned side elevation view of a first embodiment of the present invention, suitable for use in the system of FIG. 1.

Referring now to FIG. 2, the camera model system 15 is comprised of a hollow shell 19 mounted upon an annular base 21 which rests upon a floor 23. The shell 19 may be made from aluminum, steel or any other suitable material. Mounted upon the interior surface of the shell 19 is a thin, flexible material 25 which is representative of the terrain. The material 25 may be made from a sheet of vinyl plastic, a sheet of rubber or any other suitable material. The material 25 may have tabs provided thereon for attachment to the shell 19. When the material 25 is substantially air-tight, and the shell is porous to air air pressure may be used to cause the material 25 to bear against the interior surface. Accordingly, a blower 27 blows air into the shell 19 thereby providing an air pressure on the material 25. Ingress and egress may be had to the interior of the shell 19 via a solid door 29 provided with seals (not shown), hinges 31 and a latch 33; alternatively, a sliding door may be provided.

A camera-probe support structure is comprised of a camera-probe mounting member 41 which is mounted on a vertical shaft 35 by means of a pivot member 42 whereby the member 41 may be angularly displaced about a pivot axis which is normal to the shaft 35 and passes through the center of the shell 19. An arcuate sector gear 43 is secured to the member 41 radially with respect to the pivot axis. Angular displacement of the member 41 about the pivot axis is affected by a drive assembly 45 secured to the shaft 35 and having a driving pinion gear 46 in driving engagement with the gear 43.

Figure 1:
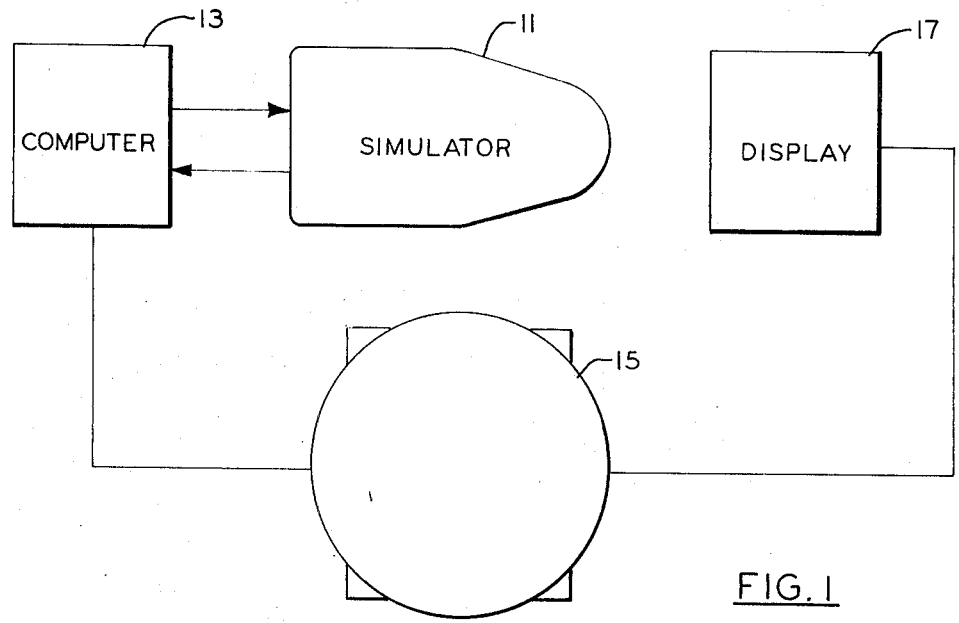
FIG. 1 is a block diagram of a camera model system.

In both embodiments of the present invention, a camera-probe assembly 47 is selectively positioned with respect to the material 25; the assembly 47 includes a camera and probe such as the one disclosed in U. S. Pat. No. 2,979,832, for providing video signals for generating an image on the display 17 (FIG. 1).

In order to provide an image of the material 25 at a selected distance therefrom, the portion of the support structure abutting the assembly 47 is mounted on slide rails 48 for displacing the assembly 47 toward and away from the material 25 along paths substantially coincident with radii thereof. Displacement along the rails 48 is accomplished by a drive means 49.

It is well known in the art that the camera and probe of the assembly 47 must be capable of giving the affect of displacement in all 6° of freedom relative to the interior of the shell 19. Three translational degrees of freedom are provided by (1) radial displacement of the assembly 47 along the member 41 to simulate altitude changes; (2) displacement of assembly 47 about the axis of the pivot 42, which corresponds to linear translation along one coordinate axis of heading; (3) displacement of assembly 47 about the axis of the shaft 35 which corresponds to linear translation along the other coordinate axis of heading. Three angular degrees of freedom corresponding to the pitch, roll, and the yaw of the aircraft are provided by the camera and probe as described in U. S. Pat. No. 3,367,046 or in any other suitable manner.

Conductive paths for electrical signals are provided via slip rings 51 to the interior of the shell 19. The conductive paths are required for conducting signals to and from the assembly 47 and providing the drive signals to the assemblies 45, 49. The slip rings 51 may also be used in providing excitation signals to lights which may be mounted on the member 41 to illuminate the portion of the material 25 being viewed on the display 17 (FIG. 1).

Figure 3:
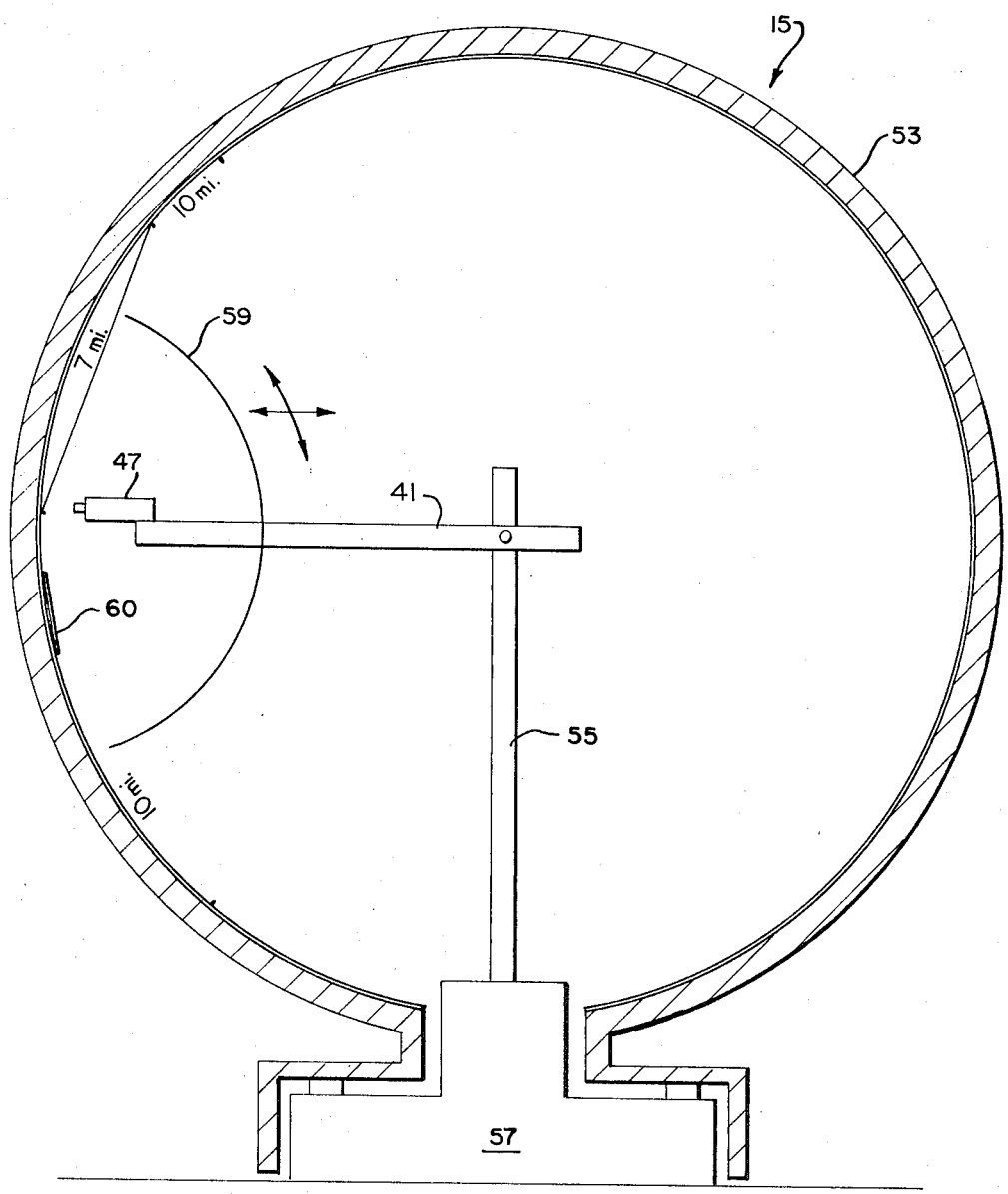
FIG. 3 is a sectioned side elevation view of features of a second embodiment of the present invention, similar in most respects to that of FIG. 2, suitable for use in the system of FIG. 1.

Referring to FIG. 3, in a second embodiment of the present invention, a hollow skeletal shell 53, similar to the shell 19, has a driving member 55 fixedly attached to a pedestal 57. In the second embodiment, the pedestal 57 is rotated to change the heading of the assembly 47. Alternatively, the frame 53 may be mounted for rotation whereby the slip rings 51 are unnecessary and the electrical noise which may be associated therewith is avoided. A sky shield and artificial horizon 59 may be mounted for movement with the assembly 47 thereby increasing the amount of the material 25 in the image on the display 17 (FIG. 1) as the distance from the assembly 47 to the material 25 increases.

In both embodiments model details may be painted or attached to the material 25 (FIGS. 2 and 3). Contours thereon may be established and changed easily by the application of pressure as described in U. S. Pat. No. 3,668,790 or in any other suitable manner. An airport area may be modeled on a solid disk 60 which may then be attached at any point on the material 25. If desired, a plurality of disks may be provided whereby flights between different airports may be simulated. The simulated airport elevation may be easily changed by establishing contours as referenced hereinbefore.

Figure 4:
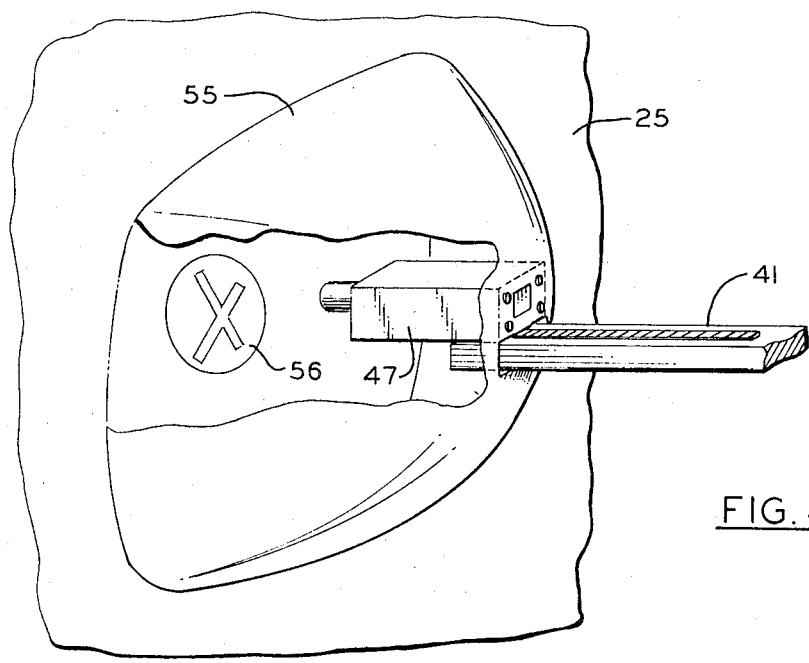
FIG. 4 is a partly sectioned perspective view of a portion of a spherical model with a sky shield and an airport model disk.

Referring now to FIG. 4, the shield 59 completely surrounds and is mounted upon the assembly 47 whereby the image provided on the display 17 is of a scene properly cut off at the horizon for all headings of the simulated aircraft. The disk 60, having model runways painted thereon, is attached to the material 25.

Because the frame is a sphere rather than a flat model, a distorted video image is provided on the display 17 (FIG. 1). The distortion is correctible either through proper optical transformation or through raster shaping in the video system. An example of the raster correction is disclosed in U. S. application Ser. No. 134,238 filed by B. J. Woycechowsky on Apr. 15, 1971. When a flat model is used, 720 sq. ft. of model area requires a minimum of 1,120 sq. ft. of floor space. The flat model must have high precision rails upon which a camera carriage is mounted, large banks of illuminator lamps and a light-tight enclosure. A spherical model only requires 725 square feet of floor space for the 720 square feet of viewing area and does not require the precision rails. Additionally, the light-tight enclosure is an inherent feature of the structure of the spherical model.

Although the invention has been shown and described with respect to preferred embodiments thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. A spherical camera model system adapted for connection to a source of position signals for driving a camera and probe in accordance with the simulated flight of an aircraft over terrain represented by said system, comprising:

a hollow shell of generally spherical shape;

a flexible sheet of material representative of said terrain mounted upon the interior surface of said shell;

a support structure in the interior of said shell upon which said camera and probe is mounted; and drive means connected to said support structure, said drive means being responsive to said position signals for driving said support structure to position said camera and probe with respect to said shell to and along any one of a multiplicity of radii thereof whereby said camera and probe selectively provides video signals representative of portions of said material at selected distances therefrom.

2. A spherical camera model system according to claim 1 wherein said material is rubber and additionally comprising means connected from the outside to the inside of said shell for providing air pressure to said material whereby said material bears against the interior surface.

3. A spherical camera model system according to claim 1 wherein said material is vinyl and additionally comprising means connected from the outside to the inside of said shell for providing air pressure to said material whereby said material bears against the interior surface.

4. A spherical camera model system according to claim 1 additionally comprising a mounted model detail mounted upon said material whereby said mounted model detail may be viewed by said camera and probe.

5. A spherical camera model system according to claim 1 wherein a painted model detail is painted upon said material whereby said painted model detail may be viewed by said camera and probe.

6. A spherical camera model system according to claim 4 wherein said mounted model detail is comprised of a solid disc which is representative of an airport.

7. A spherical camera model system according to claim 1 wherein said support structure comprises;
a vertical member mounted along a central vertical axis of said shell for rotation about the axis with respect to said frame.
a horizontal member pivotally mounted on said vertical member substantially at the center thereof, said camera and probe mounted for motion along said horizontal member.

8. A spherical model system according to claim 1 additionally comprising a sky shield and artificial horizon means connected to said camera and probe whereby said camera and probe provides video signals representative of a scene properly cut off at the horizon.

* * * * *